United States Patent [19]

Buerkel et al.

[11] Patent Number: 5,304,776
[45] Date of Patent: Apr. 19, 1994

[54] SYSTEM FOR WELDING PIPES

[75] Inventors: Steven R. Buerkel, 1336 Mark Dr., Westchester, Pa. 19380; Victor Ballard, Westchester, Pa.

[73] Assignee: Steven R. Buerkel, Westchester, Pa.

[21] Appl. No.: 36,298

[22] Filed: Mar. 24, 1993

[51] Int. Cl.$^5$ .............................................. B23K 9/16
[52] U.S. Cl. .............................. 219/125.11; 219/60 R; 219/74
[58] Field of Search .................. 219/74, 125.11, 60 R, 219/61; 228/219

[56] References Cited

U.S. PATENT DOCUMENTS 3,614,378 10/1971 Goodell .
4,121,748 10/1978 Yokokawa et al. .
4,733,051 3/1988 Nadeau et al. .
5,096,110 3/1992 Schmatz et al. .

FOREIGN PATENT DOCUMENTS

63-215375 9/1988 Japan ...................................... 219/61
2119687 11/1983 United Kingdom ................ 228/219

*Primary Examiner*—Clifford C. Shaw
*Attorney, Agent, or Firm*—Caesar, Rivise, Bernstein, Cohen & Pokotilow, Ltd.

[57] ABSTRACT

An automatic welding system uses an anti-gravitational welding controller to minimize or eliminate the undercutting and concavity of the roots of the welds caused by gravitational effects. The pressure within the pipes to be welded is continually changed as the welder orbits the pipes. At the upper section of the weld, positive pressure is applied to the pipes to eliminate undercutting at the upper surface of the weld and negative pressure (vacuum) is applied to the lower section of the weld to eliminate concavity of the root of the weld. In one mode, the internal pressure within the pipes is varied as a function of the position of the orbital welder. In another mode, the arc voltage at the tip of the weld, i.e., the distance between the tip of the weld and the surface of the weld, is maintained constant by varying the pressure within the pipes. The system allows for the completion of high quality welds with less weld material, less passes, and less time. It also allows the welding to be performed by welders who are less experienced and skilled as the present welders.

62 Claims, 8 Drawing Sheets

PRESSURE CONTROL MODE

FIG. 10

VOLTAGE CONTROL MODE

SYSTEM FOR WELDING PIPES

BACKGROUND OF THE INVENTION

This invention relates generally to systems for welding pipes, and more particularly to a system for welding pipes which automatically compensates for the gravitational effect on the weld which causes undercutting of the weld in the upper section of the weld and concavity of the root of the weld in the lower section of the weld.

Welded pipes must meet ASME (American Society of Mechanical Engineers) specifications and codes. These codes require finished weld geometry, as well as freedom from discontinuities, voids, cracks and porosity. In addition, in welding pipes together, consideration must be given to the pipe orientation due to the effect of gravity on the molten weld puddle. Thus, when two cylindrical pipes are butt welded together in a horizontal orientation, the molten weld puddle at the 12:00 position, i.e. the upper most position, will tend to sag inward, causing an undercut at the outside of the weld. Similarly, at the 6:00 position, i.e., the lower most section of the weld, the inside part of the weld (the weld root) becomes concave and the outside part of the weld bulges outward.

In order to avoid these problems, the pipes are beveled inwardly and the weld is made in many small passes using filler metal. This method keeps the puddle small and when accurately performed, the surface tension of the smaller puddle can be stronger than the force of gravity eliminating the gravitational effect described above. The amount of beveling of the pipe depends on the wall thickness. The thicker the joint is, the more weld metal is required to fill it and thus, more passes and more time are required to complete the joint.

With the present system requiring multiple passes and extreme care in making the weld, highly skilled and experienced welders are required to provide welds with minimum undercutting on the outside of the weld and minimum concaving at the root of the weld.

U.S. Pat. No. 4,121,748 (Yokokawa et al.) discloses an automatic gas pressure welding system which uses positive pressure and heating to butt end pipes together. The system automatically controls the width of the heated areas in conformity with the amount of contraction of the pipes. U.S. Pat. No. 4,733,051 (Nadea et al.) discloses an automatic control system for controlling the penetration of the weld pool. U.S. Pat. No. 5,096,110 (Shmatz et al.) shows an automatic brazing control system which employs water and oxygen pressure as a function of temperature. U.S. Pat. No. 3,614,376 (Boodell) discloses an aluminum tube welding system which applies purging gas under pressure to reduce the concavity of the outer weld surface.

An article in *Process Pipe and Tube Welding* publication published in 1991 discloses an automatic pressure control system which applies a fixed negative pressure to remove concavity at the 6:00 position.

However, none of the available welding systems apply a continuously variable pressure and vacuum within the pipes during welding which proportionately provides increasing positive pressure from the 9:00 position to the 12:00 position, decreasing positive pressure from the 12:00 position to the 3:00 position, increasing negative pressure (vacuum) from the 3:00 to the 6:00 position and decreasing negative pressure from the 6:00 position to the 9:00 position, as does the present invention. This tends to eliminate all undercutting and concavity throughout the entire circumference of the weld, with the pressure applied within the pipes varying from a maximum positive pressure at 12:00 to a maximum negative pressure at 6:00 and approximately 0 pressure applied at 3:00 and 9:00.

The system of the present invention will drastically reduce the number of passes required in obtaining a weld, the amount of undercutting and concavity of the weld, and the amount of beveling of the surfaces of the pipes being welded together at the weld, thereby reducing the amount of weld material required as well as welding time. In fact, for thin wall pipe sizes less than 0.250 inches, the requirement for a bevel joint is eliminated and the weld can be performed in a single pass using less skilled operators.

OBJECTS OF THE INVENTION

Accordingly, it is the general object of the instant invention to provide a system for welding pipes which overcomes the shortcomings of present systems.

It is a further object of the instant invention to provide a system for welding pipes which automatically minimizes or eliminates the amount of undercutting and concavity in the weld.

It is still a further object of the instant invention to provide a system for welding pipes which provides welds which meet required standards with welders of lower skill and experience than presently required.

It is still yet a further object of the instant invention to provide a system for welding pipes which minimizes the time required to perform an acceptable weld.

It is another object of the instant invention to provide a system for welding pipes which minimizes or eliminates the beveling required at the surface of the pipes at the weld.

It is still another object of the instant invention to provide a system for welding pipes which reduces or eliminates the requirement of a plurality of passes to produce the weld.

It is still yet another object of the instant invention to provide a system for welding pipes which automatically and continually varies the pressure from a maximum positive value to a maximum negative (vacuum) value as the weld torch proceeds about the circumferences of the pipes.

SUMMARY OF THE INVENTION

These and other objects of the instant invention are achieved by providing a system for welding pipes which continuously varies the pressure applied inside the pipes to eliminate the effects of gravity on the molten weld mass. Thus, undercutting in the upper section of the weld, i.e., from 9:00 to 12:00 to 3:00, and concavity of the root of the weld in the lower section of the weld, i.e. from 3:00 to 6:00 to 9:00, is eliminated. One embodiment of the invention varies the pressure from a peak positive pressure at 12:00 to a peak negative pressure at 6:00 as a function of the position of the orbital welding torch as it forms the weld. Another embodiment of the invention varies the pressure in accordance with the arc voltage which is a function of the distance between the tip of the welding torch and the molten puddle to maintain a constant distance or arc voltage thereby eliminating undercutting and concavity.

DESCRIPTION OF THE DRAWING

Other objects and many of the intended advantages of this invention will be readily appreciated when the same becomes better understood by reference of the following detailed description, when considered in connection with the accompanying drawings wherein.

DETAILED DESCRIPTION OF THE PREFERRED EMBODIMENTS

Figure 1:
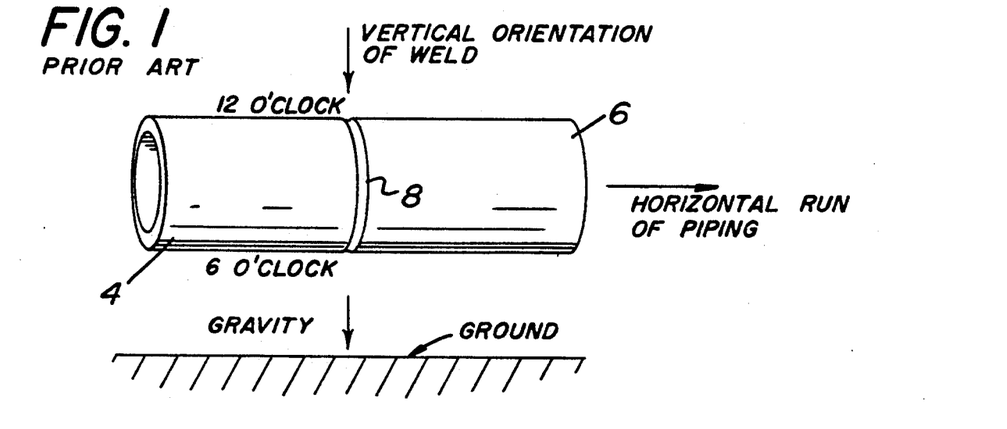
FIG. 1 is an isometric view of two pipes butt welded together showing the vertical orientation of the weld at 12:00 and 6:00 and the downward pull of gravity on the weld.
Figure 2:
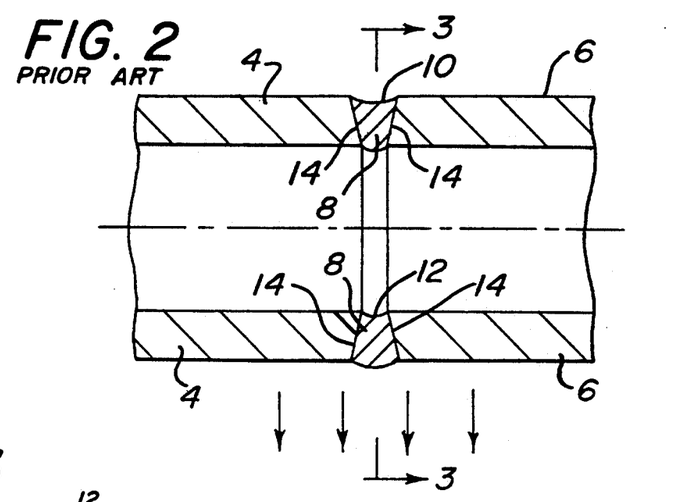
FIG. 2 is a cross-sectional view of the welded section of the pipes showing the undercutting of the outside of the weld at the 12:00 position and the concavity of the root of the weld at the 6:00 position caused by the pull of gravity on the molten weld mass.
Figure 4:
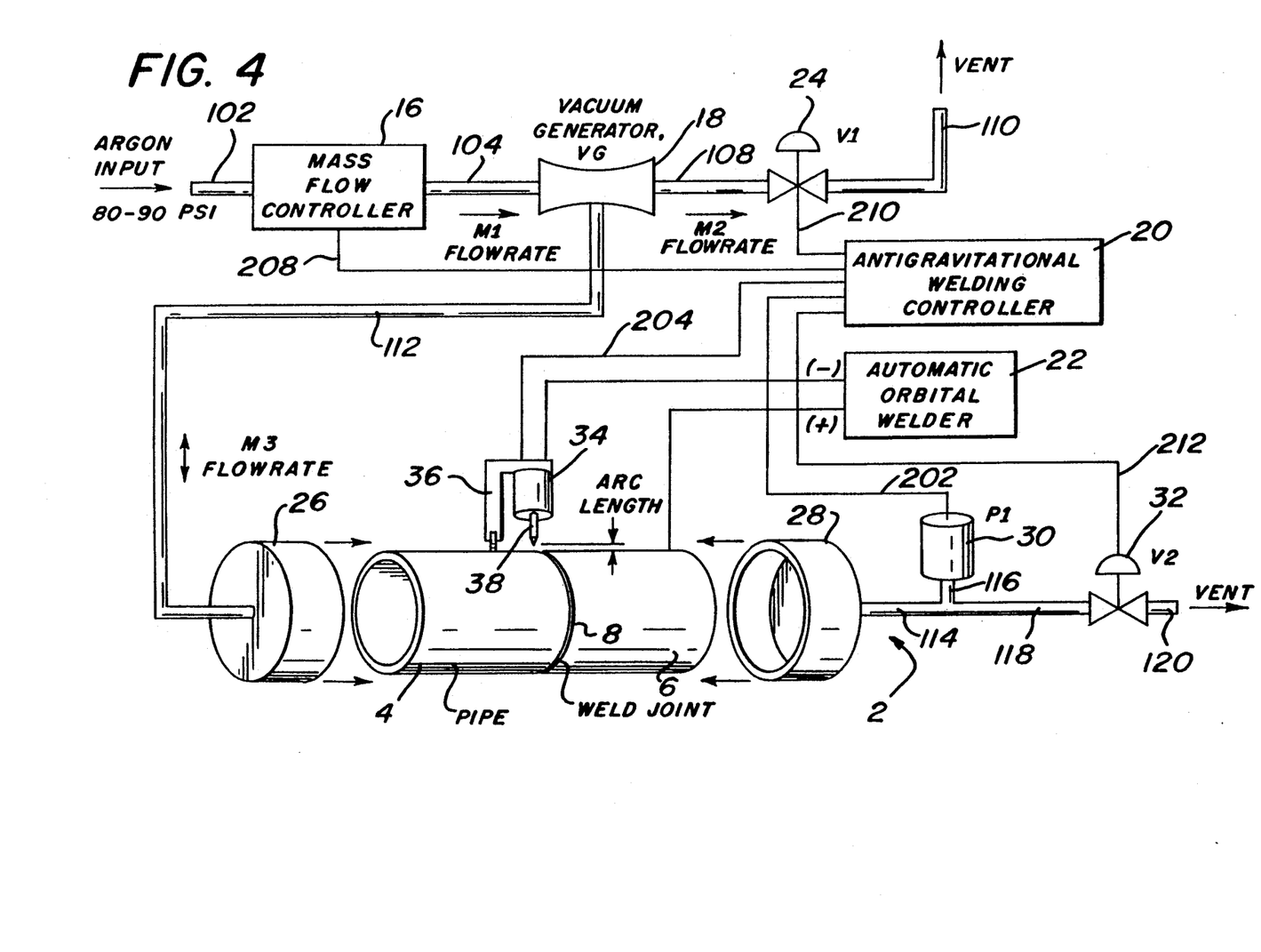
FIG. 4 is a block diagram of an embodiment of the system using the position method of control.

Referring now in greater detail to the various figures of the drawing, wherein like reference characters refer to like parts, there is shown in FIG. 4 a preferred embodiment of the system 2 using the position method for controlling the pressure within the pipes 4 and 6 to overcome the gravitational effects causing undercutting and concavity of the weld 8. Prior to describing the components and operation of the system 2, the gravitational effects on welds will be discussed. Referring to FIG. 1, the vertical orientation of the weld 8 is shown with the 12:00 section of the weld at the top and the 6:00 section of the weld at the bottom. The arrows show the downward pull of gravity on the molten weld mass 8 as the mass is being formed. In FIG. 2 is can be seen that the upper section of the weld 8 has an outer undercut surface 10, at the 12:00 position, while the root at the inner surface 12 of the weld 8, at the 6:00 position, has a concave shape. As explained previously, the downward pull of gravity causes the molten weld pool to move downward causing the undercutting of the surface 10 and the concavity of the surface 12.

Figure 3:
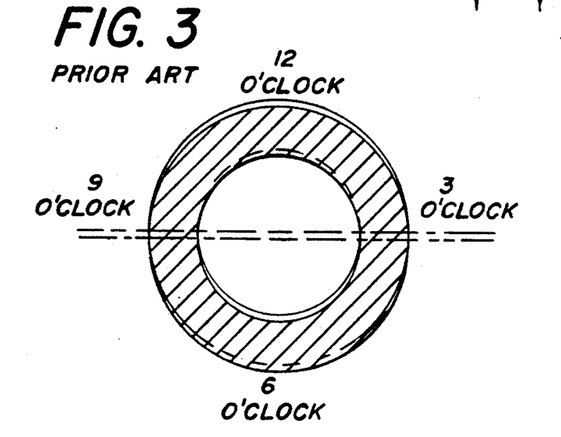
FIG. 3 is a sectional view of the pipes and the weld taken along the line 3—3 of FIG. 2.

The annular surfaces 14 of the pipes 4 and 6 have been beveled to minimize the root areas of the weld, i.e., the inner area of the weld, to minimize this gravitational effect. The undercutting of the outer surface 10 at 12:00 and the concavity of the root 12 of the weld 8 at 6:00 can also be seen in FIG. 3 which is a cross-section of the weld and pipes taken through the weld 8.

Referring again to FIG. 4, the system 2 comprises a mass flow controller 16, a vacuum generator 18, an antigravitational welding controller 20 and an automatic orbital welder 22. An argon gas source input at 80-90 (PSI) is fed into the mass flow controller 16 via piping 102.

Mass flow controllers are devices used in welding systems that measure and control gas flow. They are commercially available off-the-shelf items. The model 5851i produced by Brooks Instruments of Hatfield, Pa., or the model 13-1500 series produced by MKS or any other commercial equivalent can be used. Solenoid-activated proportioning contol valves can also be used instead of a mass flow controller. The vacuum generator 18 is a device which creates a vacuum proportional to the input gas flow it receives. The vacuum generator 18 is also a commercially available item. It can be a model PDSS-093 produced by Pat Dooley Co., Inc., of Fawnskin, Calif., or model #611210 produced by Fox Valve Development Corp. of Dover, N.J., or equivalent.

The automatic orbital welder 22 is also a commercially available item. It controls the rotation of the welding torch around the peripheral of the pipes. It also sets the arc voltage for the welding torch.

The output of the mass flow controller 16 is connected by piping 104 to the input of the vacuum generator 18. The vacuum generator 18 has two output connections. One connection, via piping 108, goes to a valve 24(V1). The output of the valve 24 is connected to piping 110 which is vented to the atmosphere.

The other output of the vacuum generator 18, via piping 112 is connected to a pipe cap 26, which covers the open end of pipe 4. The open end of the pipe 6 is also covered by a pipe cap 28. The output of the pipe cap 28 is connected to piping 114 which branches into piping 116 and piping 118. Piping 116 provides an input to pressure transducer 30 (P1), which, as will be explained later, provides an electrical signal, proportional to the pressure in the pipes 4 and 6, to the antigravitational welding controller 20 on line 202. The piping 118 is connected to the input of a valve 32 (V2). The output of the valve 32 via piping 120 is vented to the atmosphere.

The antigravitational welding controller 20, based upon inputs received from the system, controls the pressure applied inside the pipes 4 and 6 during welding. In this respect, with regard to the embodiment of FIG. 4 the antigravitational welding controller 20 receives an input from the pressure transducer 30 on line 202. It also receives orbital positional information from welding torch 34 of the automatic orbital welder 22 via line 204. Based upon these inputs, the welding controller 20 provides a continually varying electrical signal to the mass flow controller 16 on line 208 to control the pressure within pipes 4 and 6 during welding as a function of the orbital position of the welder 34. A cam assembly 36 is attached to the welding torch 34 to maintain a constant distance between the tip 38 of the welding torch 34 and the pipes 4 and 6.

In addition to controlling the operation of the mass flow controller 16, the antigravitational welding controller 20 also provides signals on lines 210 and 212 to control valves 24 and 32, respectively. As will be explained in detail below, valve 24 is a solenoid valve which under the control of the antigravitational welding controller 20 is set to the open position for partial vacuum operation and set to the closed position for positive pressure operation. Similarly, the valve 32 is a solenoid valve, which is controlled by electrical signals from the antigravitational welding controller 20 which sets the valve in the open position for the seal pass operation (low pressure operation) and for the positive pressure portion of the full penetration weld and to the closed position for the vacuum portion of the full penetration weld.

Figure 5:
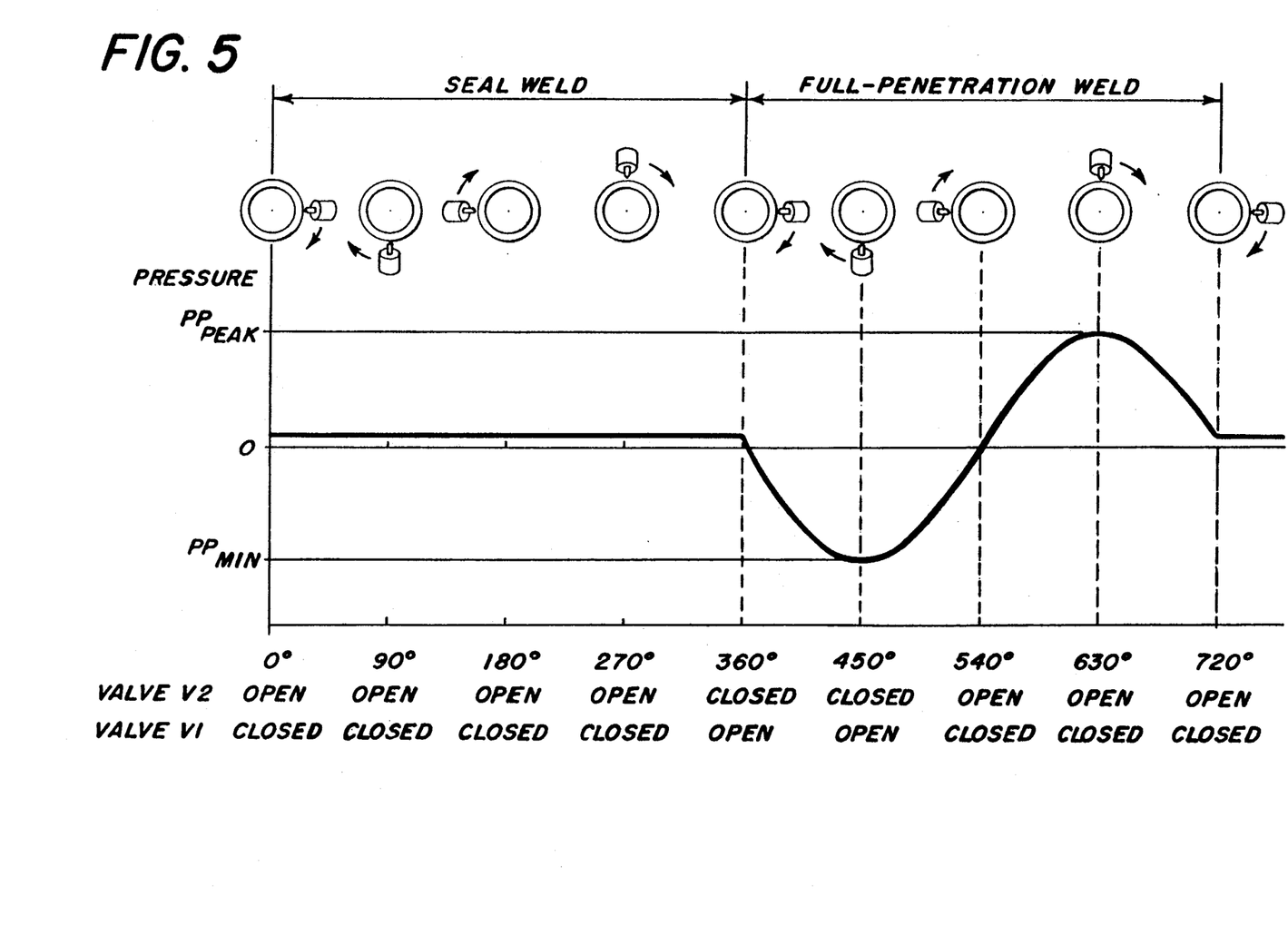
FIG. 5 is a chart showing the variation in pressure applied to the pipes of the system during welding as a function of the position of the orbital welder.

The pressure to be applied to the pipes 4 and 6 in the position mode of operation is shown in FIG. 5. Two passes are made by the orbital welder in welding the pipes 4 and 6 together. The first pass, the seal weld pass, is performed at a very low positive pressure. This is not a full penetration weld and thus there is no concern for weld puddle sag. It is intended only to seal the weld area so that during welding for full penetration, the positive and minimum pressures, as required to prevent undercutting and concavity, can be applied. Thus, during the seal welding operation, as the orbital welder beginning at 3:00 orbits the pipes 4 and 6 for a complete revolution, a constant small positive pressure is applied. The full penetration weld which follows thereafter, applies a sinusoidal variation of pressure from a neutral pressure or slightly negative pressure at 3:00 to a maximum vacuum pressure (PP min) at 6:00. The pressure increases thereafter until it reaches peak positive pressure (PPpeak) at 12:00 and then is reduced to a slight positive pressure at 3:00. A limit switch (not shown) sends a signal to the antigravitational welding controller 20 to indicate the start of the orbit at 3:00.

As mentioned previously, during the seal weld, valve 24 (V1) is closed when positive pressures are applied and is opened by the antigravitational welding controller 20 when negative pressure is applied. Conversely, the valve 32 (V2) is open during the application of positive pressure and is closed by the antigravitational welding controller 20 during the application of negative or vacuum pressure. As will be explained in detail later, the peak pressure and the minimum pressure are provided by controls at the antigravitational welding controller 20, which also forms the sinusoidal wave.

Figure 6:
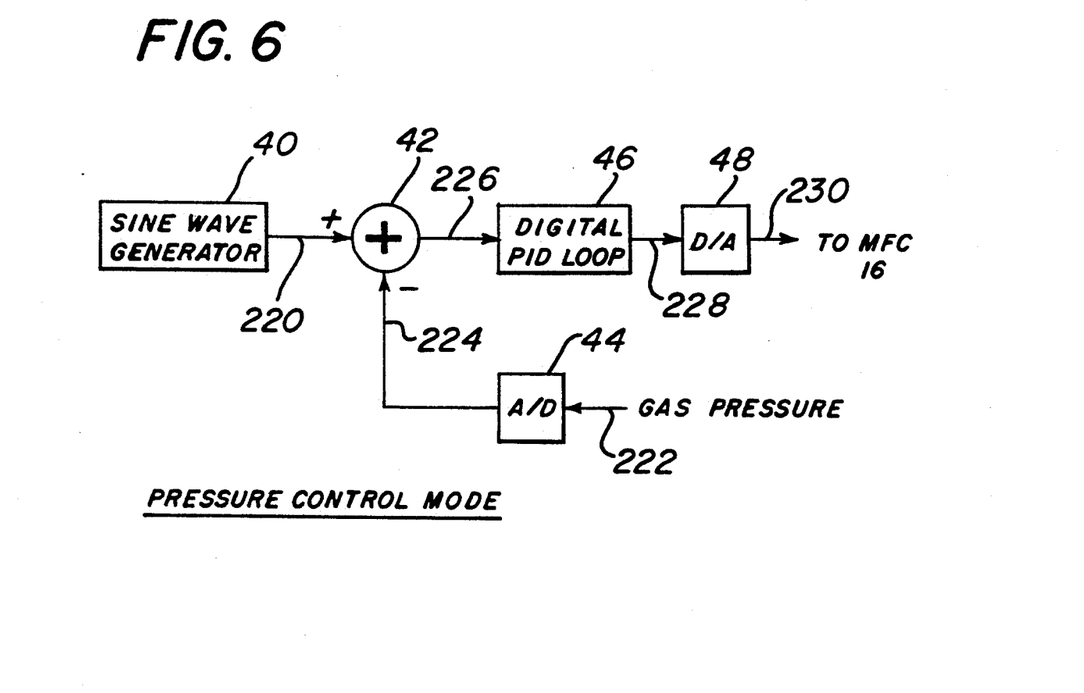
FIG. 6 is a block diagram showing the closed loop control system for the position method of control.

FIG. 6 shows the control loop for controlling the pressure within the pipes 4 and 6 when using the position method. A sine wave generator 40, which is part of the antigravitational welding controller 20 provides an input to a comparator 42 on line 220. The other input to the comparator 42 is the output of the pressure transducer 30 (P1) which provides an input on line 222, to an analog to digital converter 44. The output of the analog to digital converter 44 provides the second input to the comparator 42 on line 224. The difference between the sine wave generator input, which represents the desired pressure on line 220, and the signal on line 224, which represents the actual pressure, appears at the output of the comparator 42 on line 226. Line 226 is connected to the input of a digital PID (proportional band, integral and differential) loop.

The output of the digital PID loop 46 is connected to the input of a digital to analog converter 48 by line 228. The analog current at the output of the digital to analog converter 48 is connected to the mass flow controller 16 by line 230. This varies the output of the mass flow controller 16 which varies the gas pressure on line 222 to zero out the difference between the sine wave generator output on line 220 and the signal on line 226 representing actual pressure within the pipes 4 and 6. This causes the actual ga pressure to follow and be equal to the desired gas pressure during the welding operation.

Figure 7:
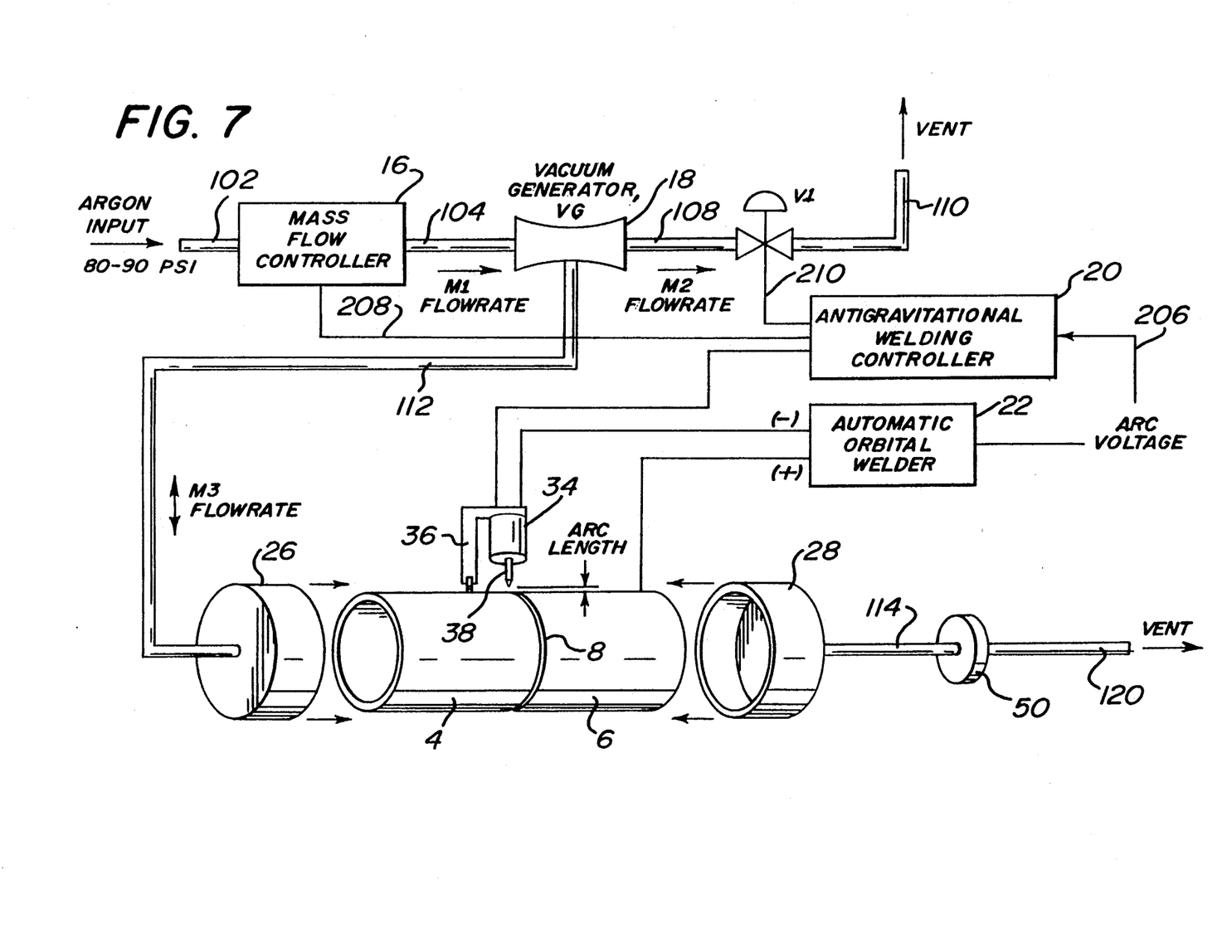
FIG. 7 is a block diagram of the system using the arc voltage method of control.

The alternative embodiment, which uses the arc voltage of the welding torch 34 to control the pressure within the pipes 4 and 6, will now be explained. Referring to FIG. 7, it is seen that a pressure transducer to read the actual pressure within the pipes 4 and 6 is not required in this embodiment. Instead, a signal from the orbital welder 22 on line 206 representing the arc voltage across the distance between the welding tip and the weld puddle is received by the antigravitational welding controller 20. The antigravitational welding controller 20 uses the level of the arc voltage on line 206 to control the pressure within pipes 4 and 6 during welding, by providing a control signal on line 208 to the mass flow controller 16, to maintain a fixed arc voltage.

Figure 8:
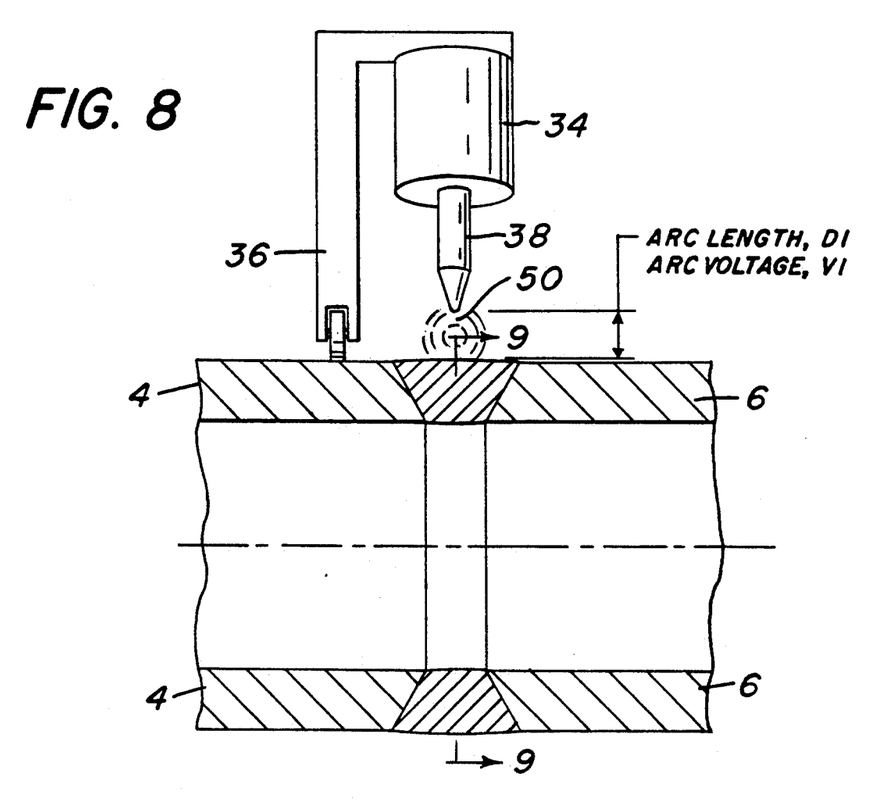
FIG. 8 is a view, partially in cross-section, showing the arc welder and the weld made using the arc voltage method of control.
Figure 9:
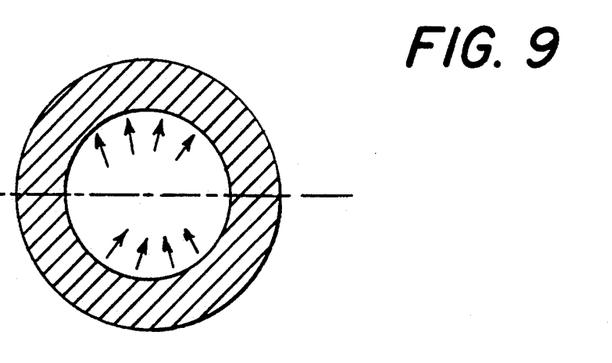
FIG. 9 is a sectional view of the weld taken along the line 9—9 of FIG. 8.

Referring now to FIG. 8, it is seen that the cam assembly 36 keeps the distance between the welding tip 38 and the surface of the pipes 4 and 6 at a fixed distance. However, should undercutting occur at the outer surface of the weld, the distance D1 between the end 50 and the surface of the weld 8 will increase. Consequently, the arc length will increase thereby increasing the arc voltage (V1). The increase in the arc voltage V1 will cause the antigravitational welding controller 20 to change its signal to the mass flow controller 16 to increase the pressure in the pipes 4 and 6, thereby reducing the arc length, thus reducing the undercutting. Similarly, for the lower section of the pipes 4 and 6, where the outer surface of the weld 8 tends to bulge outward toward the end 50 thereby reducing the arc length and reducing the arc voltage, the antigravitational welding controller 20 will signal the mass flow controller 16 to reduce the pressure, i.e., to increase the vacuum, to reduce the bulging tending to increase the arc length D1. Thus, as the orbital welder 34 rotates around the pipes 4 and 6 during welding, the distance between the tip 50 and the surface of the weld (the arc length D1) will tend to remain constant, thereby eliminating undercutting and concavity of the root of the weld.

Figure 10:
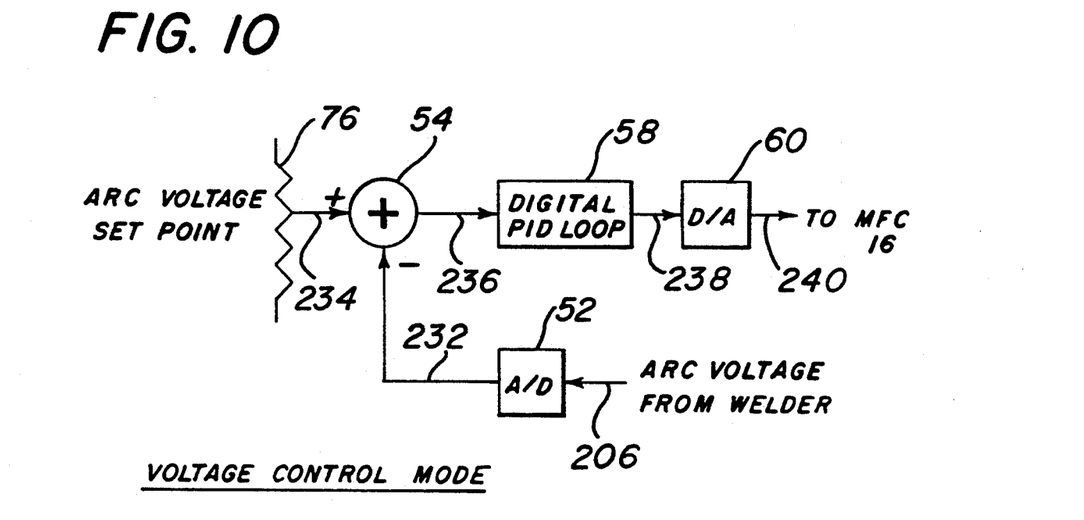
FIG. 10 is a block diagram of the closed loop control system for the arc voltage method of control.

FIG. 10 shows the operation of the control loop for this embodiment which uses the arc voltage from the welder 22 to prevent undercutting and concavity. A signal representing the arc voltage from the welder 22, on line 206, is sent to an analog to digital converter 52, whose output represents the incoming signal in digital form, on line 232. This signal is connected to an input to a comparator 54. Another input to the comparator 54 is a digital signal representing the arc voltage set point, or the desired arc voltage, to be maintained. This set point is adjustable and set by an operator using a control 76, as will be explained later. The signal representing the arc voltage set point is provided to the comparator 54 on line 234. The output of the comparator 54 is connected to a digital PID loop 58, which is connected to a digital to analog converter 60 by line 238. The output of the digital to analog converter 60 [on line 240 is an analog signal which is sent to the mass flow controller 16 to vary the pressure so as to minimize and eliminate the difference in level between the signals representing the arc voltage from the welder and the arc voltage set point.

Figure 11:
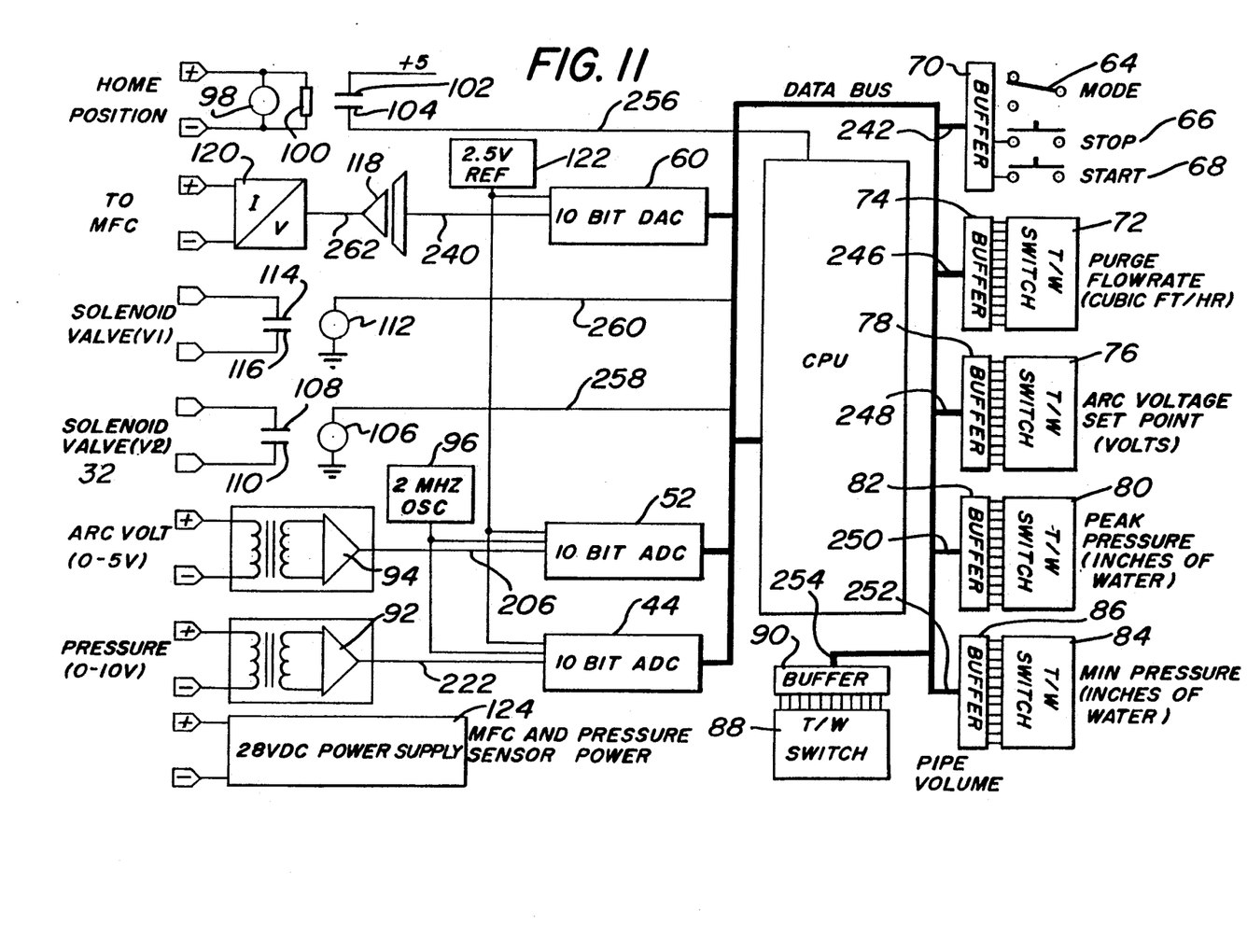
FIG. 11 is a block diagram of the controller for the system showing the operator controls and the connections to the remainder of the system.

The antigravitational welding controller 20 with its associated input output equipment and controls is shown in FIG. 11. The controller 20 comprises a CPU 62 with a microprocessor used in conjunction with an 8K×8 Static RAM memory and a 64K×8 EPROM memory. A Signetics type S80C555-1A68 microprocessor or equivalent; an Hitachi NM6264LPI-15 Static RAM memory; and an Hitachi NMC27C512AQ200 EPROM Memory, or equivalents can be used.

Various controls are used for the system. A MODE SPDT (Single Pole Double Throw) toggle switch 64 is used to select the position control method of system operation or the arc voltage control method. A STOP button 66, which is a momentary action single pole, single throw, normally closed push button switch, is used to stop the controller. A START button 68, which is also a momentary action, single pole, single throw, normally open push button switch, is used to start the controller. The outputs of the MODE switch 64, the STOP button 66, and the START button 68 are connected to a buffer 70 which is connected to the data bus of the CPU 62 by line 242. The PURGE FLOW RATE switch 72 comprises a three decade thumb wheel used to select the gas flow rate, in cubic feet per hour, which flows during the initial seal welding pass and which also flows after the welding has been completed the cool the weld. It is connected to a buffer 74, which is in turn connected to the data bus of the CPU 62 by line 246.

The ARC VOLTAGE control 76 also comprises a three decade thumb wheel switch which is used to select the desired arc voltage. This voltage is usually between 8 and 12 volts. The set point is used as a reference signal for the PID loop 58 as was discussed previously in conjunction with FIG. 10. The output of control 76 is connected to a buffer 78. Line 348 connects the output of the buffer 78 to the data bus of the CPU 62.

The PEAK PRESSURE switch 80 is also a three decade thumb wheel switch which is used to select the peak positive pressure (in inches of water) in the pipe to produce a solenoid wave which provides the reference signal for the PID loop 46 as has been previously described and shown in FIG. 6. The output of the PEAK PRESSURE switch 80 is connected to a buffer 82 which sends the desired peak pressure to the bus of the CPU 62 on line 250.

The MIN PRESSURE switch 84 comprises a three decade thumb wheel switch which is used to select the minimum negative pressure (in inches of water) in the pipes for the sinusoidal wave that provides the reference signal for the PID loop 46. The output of switch 84, which is a three decade thumb wheel switch, is connected to the input of a buffer 86 whose output is in turn connected to the data bus of the CPU 62 by line 252. As previously described, the peak and minimum pressure inputs enable the controller 20 to generate a reference sinusoidal pressure signal in the position mode of control.

Another three decade switch allows the operator to input into the CPU 62 of the antigravitational weld controller 20, the pipe volume of the pipes that are to be butt welded in cubic inches. The PIPE VOLUME switch 88 is translated by the CPU 62 into parameters which determine the response of the PID control loops 46 and 48 (proportional band, integral (integrating) rate, and differential). Therefore, the time constant of the PID loop is changed proportionately to the volume of the pipes 4 and 6. The output of the PIPE VOLUME switch 88 is connected to the input of a buffer 90 whose output is in turn connected to the data bus of CPU 62 via line 254.

Other inputs to the antigravitational welding controller 20 include the pressure measured by the pressure transducer 30 (P1), the arc voltage received from the automatic orbital welder 22 and the home position information received by a limit switch which indicates when the welding torch has arrived at the 3:00 position. These inputs will now be discussed in turn. The pressure input is a 0–10 volt DC signal proportional to the absolute pressure within the pipes 4 and 6. This analog signal is coupled to the welding controller 20 via an isolation amplifier 92 whose output is connected to the 10 bit analog to digital converter 44 by line 222 as previously discussed and shown in FIG. 6. A commercially available Baratron model 102AA-00010 or equivalent can be used for the amplifier 92. It measures absolute pressure over a range of 0–10 TORR (millimeters of mercury) and provides a 0–10 volt DC signal proportional to the absolute pressure.

The ARC VOLTAGE signal is coupled to the welding controller 20 via an isolation amplifier 94. The output of the isolation amplifier 94 on line 206 is connected to the 10 bit analog to digital converter 52 as discussed previously and shown in FIG. 10. A 2 MegaHertz oscillator 96 provides clock timing to the analog to digital converters 44 and 52.

The third input to the CPU 62 from the system is the home position input. This is provided by a limit switch 98 which operates when the orbital welder torch 34 is at the 3:00 position This energizes a relay 100 whose contacts 102 and 104 close at the 3:00 position, providing a signal to the CPU 62 which serves as a reference orbital position to the antigravitational welding controller 20 when the welding torch orbits the pipes 4 and 6. The closure of the contacts 102 and 104 provides a voltage on line 256 which is connected to the CPU 62.

There are three outputs from the antigravitational welding controller to the system. One output, on line 258, operates valve 32 (V2). The signal on line 258 opens valve V2 during the seal weld when there is a slightly positive pressure applied to the pipes 4 and 6 and during the positive pressure portion of the full penetration weld, and closes the valve 32 when negative pressure is applied during the full penetration weld. The signal operates solenoid 106 which operates contacts 108 and 110 to operate the valve 32. A second output from the CPU 62 on line 260 operates solenoid 112 to open and close valve 24 (V1). When solenoid 112 is energized, contacts 114 and 116 are closed. As discussed previously, valve 24 (V1) is closed when positive pressure is applied to pipes 4 and 6 and opened when negative pressure is applied.

A third output from the CPU 62 is the output to the mass flow controller 16 to control the pressure within the pipes 4 and 6. The ten bit digital to analog converter 60, as was previously discussed and shown in FIG. 10, is connected via line 240 to isolating amplifier 118. The output of the isolating amplifier 118 is connected to the input of the voltage to current converter 120. A Burr-Browm model IS0122P or the equivalent, which provides 1500 VMS and 140 db isolation may be used. This isolated voltage signal is then converted into 4 to 20 milliamp signal to drive the mass flow controller 16.

A 2.5 reference source 122 is used to provide voltage for the digital to analog converter 60 and the analog to digital converters 44 and 52. Power for the mass flow controller and the pressure sensor at 28 volts dc is provided by power supply 124 from the antigravitational welding controller.

Figure 12:
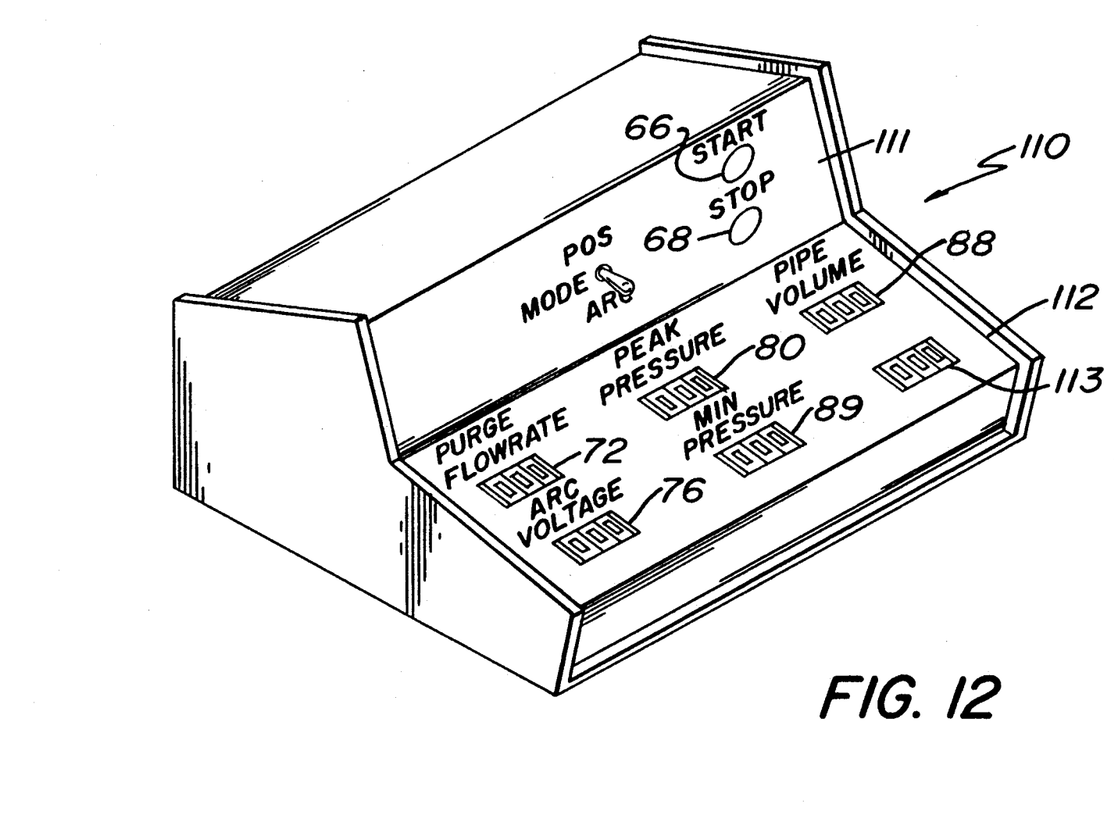
FIG. 12 is an isometric view of the control panel of the system.

A control station 110 is provided for operator control of the system as shown in FIG. 12. The five, three decade thumb wheel switches 72, 76, 80, 84 and 88 are mounted on a panel 112. A spare three decade thumb wheel switch 113 is also mounted on the panel 112. The two position mode switch 64 is mounted on a panel 111 of the control station 110. START button 68 and STOP button 66 are also mounted on the panel 111. Exemplary dimensions for the control stations 110 are a width of approximately 8–10 inches, a depth of approximately 8–10 inches and a height of approximately 5–6 inches.

The operation of the system will now be described.

POSITION METHOD OF OPERATION

The operator sets the MODE switch in the POS position. The purge flow rate is then set using the thumb wheel switch 72 in cubic feet per hour. The peak pressure is set in inches of water using thumb wheel switch 80; and the minimum pressure in inches of water is set using thumb wheel switch 84. It is not necessary to set the arc voltage switch 76. The orbital welding electrode is set to the 3:00 position. The START push button 68 is depressed to initiate the welding cycle.

During welding pass #1, which seals the two pipes 4 and 6 to be welded, the 4–20 milliamp output of the mass flow controller 16 will cause the selected flow rate of purge gas into the pipe sections to be welded. The CPU 62 will monitor the time required to complete one pass (when the home position microswitch closes at the 3:00 position). This time will be used to calculate the period for the sine wave input reference signal from the sine wave generator 40 which is used for welding pass #2.

During the welding pass #2, which provides the deep penetration weld, the software program generates a sinusoidal pressure reference signal according to the peak and minimum pressures based on the time period measured in pass #1, the seal weld pass. The welding controller will attempt to match the sinusoidal variant pressure by using the actual pressure measured in pipes 4 and 6 by the pressure transducer 30 (P1) as feedback with the output of the PID loop 46 driving the mass flow controller 6. The pressure output is determined by the following equations:

0° to 180°

$$MFC = Pmin \sin [6.28\ t/T] - C_1$$

180° to 360°

$$MFC = Ppeak \sin [6.28\ t/T] - C_2$$

where: t is the instantaneous time in seconds, T is the time in seconds for pass #1, Pmin is the maximum negative pressure applied to the pipe, Ppeak is the maximum positive pressure applied to the pipe, and MFC is the signal applied to the mass flow controller. $C_1$ and $C_2$ are constants that are used to determine the general geometry of the finished weld bead. If a reinforced root (inside bead) is desired, then $C_1$ and $C_2$ will have a positive value.

Upon completion of pass #2, the output of the mass flow controller resets to the purge flow rate originally selected while the weld cools. Once the weld cools, the operator momentarily depresses the STOP button 66 to stop the gas purge. This completes the weld cycle in the position mode.

ARC VOLTAGE METHOD OF OPERATION

Prior to starting the welding operation, the operator selects the following parameters. The MODE switch 64 is set to the arc voltage position. The orbiter welding electrode is positioned at the 3:00 position. The START push button 68 is depressed to initiate the cycle. During welding pass #1, the seal weld pass, the 4–20 milliamp output to the mass flow controller 16 will cause the selected flow rate of purge gas into the pipe section to be welded.

During welding pass #2, the full penetration weld, the welding controller will attempt to hold the arc voltage constant by using the arc voltage as a feedback, with the output of the PID loop 58 driving the mass flow controller 16. Upon completion of pass #2, the output of the mass flow controller will reset to the purge flow rate originally selected while the weld cools. Once the weld cools sufficiently, the operator momentarily depresses the STOP push button 68 to stop the gas purge. This completes the weld cycle in the arc voltage mode.

A system for welding pipes which uses an antigravitational welding controller to eliminate undercutting and concavity of the root weld caused by gravitational effects has been described. This system uses commercially available off the shelf parts and can be operated in two modes. The first mode is the position method wherein the pressure within the pipes to be welded is continually changed in sinusoidal form from a positive peak voltage at the 12:00 position of the weld to a negative peak voltage at the 6:00 position of the weld. The second mode of operation adjusts the pressure within the pipes to be welded so as to maintain a constant arc voltage, i.e., a constant distance between the outer surface of the weld and the tip of the welding torch, as the welding torch orbits the pipes.

This system drastically reduces the number of weld passes required, minimizes or eliminates a requirement for multiple welding passes, and minimizes or eliminates the amount of beveling of the surfaces of the pipes at the butt weld required, thereby reducing the number of passes and the amount of weld material required. In addition, with the use of this system, high quality welding operations can be performed with operators of less experience and skill than is presently required.

Without further elaboration, the foregoing will so fully illustrate my invention, that others may, by applying current or future knowledge, readily adapt the same for use under the varying conditions of service.

We claim:

1. A system for welding pipes comprising a source of gas, an orbital welding means having a welding torch which orbits said pipes during welding operations, means, responsive to the orbital position of the welding torch, for producing a variable pressure within said pipes to minimize the gravitational effects on the weld produced by said orbital welding means, said means for producing said variable pressure comprising means for controlling the rate of the gas flow of said source of gas, and means for producing a continuously variable positive or negative pressure within said pipes as a function of said rate of gas flow, said pressure producing means including means for increasing said pressure proportionally from approximately zero when said welding torch is at the 9 o'clock position to a predetermined positive value when said welding torch is approximately at the 12 o'clock position and decreasing proportionally from said predetermined positive value when said welding torch is at said 12 o'clock position to approximately zero when said welding torch is at said 3 o'clock position, and proportionally decreasing said pressure from approximately zero when said welding torch is at said 3 o'clock position to a predetermined negative value when said welding torch is at the 6 o'clock position, and increasing said pressure from said predetermined negative value at said 6 o'clock position to approximately zero when said welding torch is at said 9 o'clock position, as said welding torch orbits said pipes.

2. The system of claim 1 wherein said means for controlling said rate of gas flow comprises a mass flow controller and a central controller, which is connected to said mass flow controller.

3. The system of claim 2 wherein said means for producing said continuously varying positive and negative pressure as a function of said rate of gas flow comprises a vacuum generator.

4. The system of claim 3 wherein said system further includes means for measuring said pressure within said pipes, said pressure measuring means comprising a pressure transducer, connected to said central controller, comprising means to produce a first electrical signal representative of the pressure within said pipes.

5. The system of claim 4 wherein said orbital welder comprises means for producing a second electrical signal, connected to said central controller, which represents the position of said welding torch during welding operations.

6. The system of claim 5 wherein said central controller further comprises means to produce a third signal representing a reference variable pressure to be applied to said pipes during welding operations.

7. The system of claim 6 wherein said central controller further comprises means for comparing said first signal representing the pressure within said pipes to said third signal representing the reference variable pressure to be applied to said pipes and closed loop feedback means for causing said first signal to correspond to said third signal.

8. The system of claim 7 wherein said third signal comprises a sine wave generated by said central controller and said central controller further comprises means to define and set the maximum and minimum values of said sine wave.

9. The system of claim 8 wherein said central controller further comprises a control station having a panel and said means to define and set the maximum and minimum value of said sine wave comprises controls mounted on said panel.

10. The system of claim 9 wherein said panel further comprises controls for starting and stopping the operation of said central controller.

11. The system of claim 3 wherein said system further comprises a first valve connected to a first output of said vacuum generator.

12. The system of claim 11 wherein said central controller comprises means to generate a first control signal which is connected to said first valve and said first valve operates in response to said first control signal.

13. The system of claim 12 wherein said first valve is closed by said first control signal when said pressure within said pipes is positive and said first valve is opened by said first control signal when said pressure within said pipes is negative.

14. The system of claim 3 wherein said system further comprises means for applying the pressure produced by said vacuum generator to the interior of said pipes.

15. The system of claim 14 wherein said pipes comprise a first and a second pipe, and each of said pipes comprise a first end and a second end, said ends having an annular surface and said pipes are positioned with said first ends abutting each other to be welded together by said orbital welding means.

16. The system of claim 15 wherein said means for applying pressure produced by said vacuum generator comprises a first cap placed over said second end of said first pipe and piping connecting a second output of said vacuum generator to said cap.

17. The system of claim 16 wherein said means for applying pressure further comprises a second cap which is placed over said second end of said second pipe and wherein said system further comprises a second valve connected to said second cap.

18. The system of claim 17 wherein said central controller further comprises means to generate a second control signal which is connected to said second valve and said second valve operates in response to said second control signal.

19. The system of claim 18 wherein said second valve is opened by said second control signal when said pressure within said is positive and said second valve is closed by said second control signal when said pressure within said pipes is negative.

20. The system of claim 3 wherein said orbital welding means comprises means for causing said welding torch to orbit said pipes once to produce a seal weld during which a gas purge flowrate is provided at a low positive pressure to the interior of said pipes by said vacuum generator and means for causing said welding torch to orbit said pipes a second time to produce a full penetration weld during which said variable positive and negative pressure is provided to the interior of said pipes.

21. The system of claim 20 wherein said control station further comprises a control for manually setting said purge flowrate.

22. The system of claim 21 wherein said system further means for providing a signal to said central controller when said welding torch reaches a pre-determined position as it orbits said pipes.

23. The system of claim 22 wherein said means for providing a signal to said central controller comprises a limit switch having contacts which operate when said welding torch arrives at said pre-determined position as it orbits said pipes.

24. The system of claim 1 wherein said orbital welder further comprises means to provide an arc voltage to said welding torch and said system further comprises means for producing a varying pressure within said pipes responsive to variations in said arc voltage.

25. The system of claim 24 wherein said system further comprises means for selecting either said means for producing said varying pressure responsive to said variations in arc voltage or said means for producing said varying pressure responsive to the position of said welding torch as it orbits said pipes.

26. A system for welding pipes comprising a source of gas, an orbital welding means having, and providing an arc voltage to, a welding torch which orbits said pipes during welding operations, means for producing a variable pressure within said pipes to minimize the gravitational effects on the weld, responsive to variations in said arc voltage produced by said orbital welding means, said means for producing said variable pressure comprising means for controlling the rate of the gas flow of said source of gas as a function of the said variations in arc voltage, and means for producing a continuously variable positive or negative pressure as a function of said rate of gas flow.

27. The system of claim 26 wherein said means for controlling said rate of gas flow comprises a mass flow controller and a central controller, which is connected to said mass flow controller.

28. The system of claim 27 wherein said means for producing said continuously varying positive and negative pressure as a function of said rate of gas flow comprises a vacuum generator.

29. The system of claim 28 wherein said central controller comprises means for producing a reference arc voltage.

30. The system of claim 29 wherein said central controller further comprises means for comparing said arc voltage to said to said reference arc voltage and closed loop feedback means for varying said variable pressure to cause said arc voltage to correspond to said reference arc voltage.

31. The system of claim 30 wherein said central controller further comprises a control station having a panel and said means for producing said reference arc voltage comprises a control mounted on said panel.

32. The system of claim 29 wherein said orbital welding means comprising means for causing said welding torch to orbit said pipes once to produce a seal weld during which a gas purge flowrate is provided at a low positive pressure to the interior of said pipes by said vacuum generator and means or causing said welding torch to orbit said pipes a second time to produce a full penetration weld during which said variable positive and negative pressure is provided to the interior of said pipes.

33. The system of claim 32 wherein said control station further comprises a control for manually setting said purge flowrate.

34. The system of claim 33 wherein said system further means for providing a signal to said central controller when said welding torch reaches a pre-determined position as it orbits said pipes.

35. The system of claim 34 wherein said means for providing a signal to said central controller comprises a limit switch having contact which operate when said welding torch arrives at said pre-determined position as it orbits said pipes.

36. The system of claim 28 wherein said system further comprises a first valve connected to a first output of said vacuum generator.

37. The system of claim 36 wherein said central controller further comprises means to generate a first control signal which is connected to said first valve and said first valve operates in response to said first control signal.

38. The system of claim 37 wherein said first valve is closed by said first control signal when said pressure within said pipes is positive and said first valve is opened by said first control signal when said pressure within said pipes is negative.

39. The system of claim 26 wherein said system further comprises means for applying the pressure produced by said vacuum generator to the interior of said pipes.

40. The system of claim 39 wherein said pipes comprise a first and a second pipe, and each of said pipes comprise a first end and a second end, said ends having an annular surface and said pipes are positioned with said first ends abutting each other to be welded together by said orbital welding means.

41. The system of claim 40 wherein said means for applying pressure produced by said vacuum generator comprises a first cap placed over said second end of said first pipe and piping connecting a second output of said vacuum generator to said cap.

42. The system of claim 41 wherein said means for applying pressure further comprises a second cap which is placed over said second end of said second pipe and wherein said system further comprises a relief valve connected to said second cap said valve comprising means to open when said pressure reaches a predetermined determined level.

43. The system of claim 26 wherein said system further comprises means for producing a varying pressure within said pipes responsive to the position of said welding torch as it orbits said pipes.

44. The system of claim 43 wherein said system further comprises means for selecting either said means for producing said varying pressure responsive to said arc voltages or said means for producing said varying pressure responsive to the position of said welding torch as it orbits said pipes.

45. A controller for controlling a system for welding pipes, said system comprising an orbital welding means providing an arc voltage to a welding torch which orbits said pipes during welding operations, said controller comprising a central processing unit, a control station, means for applying pressure within said pipes, means for varying said pressure within said pipes during welding operations responsive to said arc voltage, said means for varying the pressure within said pipes comprising means for setting a reference arc voltage, means for comparing said reference arc voltage to said arc voltage provided to said welding torch, and a feedback loop means for varying said pressure to make said arc voltage correspond to said reference arc voltage.

46. The controller of claim 45 wherein said control station comprises a panel and said means for setting said reference arc voltage comprises a first control mounted on said panel.

47. The controller of claim 46 wherein said means for comparing said reference arc voltage to said arc voltage provided to said welding torch comprises a comparator.

48. The controller of claim 47 wherein said comparator is provided by software in said central processing unit.

49. The controller of claim 47 wherein said feedback loop is provided by software in said central processing unit.

50. The controller of claim 49 wherein said feedback loop has a time constant responsive to the volume within said pipes.

51. The controller of claim 50 wherein said control station further comprises a means for setting said volume comprising a second control mounted on said panel.

52. The controller of claim 45 wherein said controller further comprises second means for varying said pressure within said pipes responsive to the position of said welding torch as it orbits said pipes.

53. The controller of claim 52 wherein said controller further comprises means for producing a varying reference voltage representing said pressure within said pipes.

54. The controller of claim 53 wherein said varying reference voltage comprises maximum and minimum voltage levels and said control station further comprises means for setting said maximum and minimum levels.

55. The controller of claim 54 wherein said means for setting said maximum and minimum levels respectively comprises a third and a fourth control mounted on said panel.

56. The controller of claim 55 wherein said system further comprises a pressure transducer which converts the pressure within said pipes to an electric voltage representing said pressure and said controller further comprises means to compare said electric voltage representing said pressure to said varying reference voltage.

57. The controller of claim 56 wherein said controller further comprises means for comparing said varying reference voltage to electric voltage representing said pressure and a feedback loop means for varying said pressure so that said electric voltage representing said pressure corresponds to said varying reference voltage.

58. The controller of claim 57 wherein said orbital welding means comprises means for causing said welding torch to orbit said pipes twice, once to produce a seal weld during which a purge gas flow rate at a low positive pressure is provided to said pipes and the second time to produce a full-penetration weld, during which continuously varying pressure is applied to said pipes.

59. The controller of claim 58 wherein said controller further comprises means to set said purge gas rate during said seal weld comprising a fifth control mounted on said panel.

60. The controller of claim 59 wherein said controller further comprises means to select either said first means for varying the pressure within said pipes responsive to said arc voltage or said second means for varying the pressure within said pipes responsive to the position of said welding torch as it orbits said pipes.

61. A system for welding pipes comprising a source of gas, an orbital welding means having a welding torch which orbits said pipes during welding operations, means, responsive to the orbital position of the welding torch, for producing a variable pressure within said pipes to minimize the gravitational effects on the weld produced by said orbital welding means, said means for producing said variable pressure comprising means for controlling the rate of the gas flow of said source of gas, and means for producing a continuously variable positive or negative pressure as a function of said rate of gas flow, said orbital welder further comprising means to provide an arc voltage to said welding torch and said system further comprising means for producing a varying pressure within said pipes responsive to variations in said arc voltage.

62. The system of claim 61 wherein said system further comprises means for selecting either said means for producing said varying pressure responsive to said variations in arc voltage or said means for producing said varying pressure responsive to the position of said welding torch as it orbits said pipes.

* * * * *